United States Patent
Eusebi

[19]

[11] Patent Number: 5,931,494
[45] Date of Patent: Aug. 3, 1999

[54] AIR BAG MODULE WITH REMOTE SWITCH

[75] Inventor: Christopher Eusebi, White Lake, Mich.

[73] Assignee: Breed Automotive Technology, Inc., Lakeland, Fla.

[21] Appl. No.: 08/800,897

[22] Filed: Feb. 12, 1997

[51] Int. Cl.$^6$ .................................................. B60R 21/16
[52] U.S. Cl. ................... 280/731; 200/61.54; 200/83 Z; 74/484 H
[58] Field of Search .................. 280/731, 728.1; 200/61.54, 83 Z; 74/484 H

[56] References Cited

U.S. PATENT DOCUMENTS

| | | | |
|---|---|---|---|
| 5,113,048 | 5/1992 | Lafferty | 200/83 Z |
| 5,398,962 | 3/1995 | Kropp | 280/731 |
| 5,698,828 | 12/1997 | Perkins | 200/61.54 |
| 5,743,555 | 4/1998 | Durrani | 280/731 |

*Primary Examiner*—Christopher P. Ellis
*Attorney, Agent, or Firm*—Markell Seitzman

[57] ABSTRACT

A driver side air bag module (50, 50', 50") formed of an air bag cover (2), mounting plate (10), inflator (22), and cushion (12). The driver side air bag module cover (2) includes a relatively flexible horn actuation area (4) which is depressible from its upper surface (6) by a driver. A primarily airtight chamber (18) can be found inside the air bag module (50) being coupled to a sensor (14) for sensing changes in pressure and actuating a horn (32).

18 Claims, 3 Drawing Sheets

AIR BAG MODULE WITH REMOTE SWITCH

BACKGROUND AND SUMMARY OF THE INVENTION

This invention generally relates to motor vehicle air bags. More particularly, the invention relates to a driver side air bag module having an integral horn switch which is easily and reliably actuated.

A driver side air bag module is typically mounted upon a motor vehicle's steering wheel. A typical module includes a mounting plate attached to the hub of the steering wheel, an inflator mounted to the mounting plate, an air bag and a cover. The prior art teaches that horn switches can be placed within spokes of the steering wheel. The orientation of this type of horn switch moves relative to the occupant as the steering wheel is rotated. Several other designs have incorporated a horn mechanism into the air bag module cover. The vehicle horn switch was formed by floating the air bag module on a spring assembly within a steering wheel assembly. To actuate the horn the entire module is moved toward the steering wheel hub. This method of horn switch design is expensive and leads to fit and finish problems between the module and the steering wheel.

Another type of horn switch mounts a thin, flexible membrane switch on the back or inner surface of the air bag module cover. Membrane switches conventionally comprise two very thin non-conductive sheets having conductive coatings separated by thin spacers. Pressure on the switch moves the conductive surfaces together to close an electrical circuit and actuate the horn. The membrane switches are expensive and their installation is labor intensive. In the case of a malfunction of the horn switch, the entire air bag module must be replaced as the switch is an integral part of the cover.

The primary object of the invention is to provide an air bag module with a reliable horn switch which is removable without disassembly of the module. Other objects, features, and advantages will become apparent from the following description and appended claims.

Accordingly the invention comprises: a driver side air bag module having an air bag cover, mounting plate, inflator, and cushion. The driver side air bag module cover includes a relatively flexible horn actuation area which is depressible from its front surface by a driver. A substantially airtight pressure chamber is provided inside the air bag module. The chamber may be formed by a thin flexible membrane or bladder. This chamber can be either surrounding or adjacent to the cushion.

A pressure sensitive sensor is mounted either on the interior or exterior surface of the mounting plate and generally behind the horn actuation area. This sensor, which is fluidly coupled to the pressure chamber by means of a passage such as a tube, is responsive to determinable changes in pressure or rates of pressure change within the chamber. The change in pressure is caused by a change in volume of the chamber when the flexible horn actuation area is depressed. The sensor then produces a signal which activates a horn.

In a second embodiment of the invention, the chamber is formed by joining the cover and the mounting plate. A seal, that is sufficiently fluid tight, is provided at the joint between the cover and the mounting plate forming the chamber. Sealing methods between plastic and metal components are known but can include secondary material such as neoprene or other elastomers, or an appropriately designed joint in the plastic cover and base plate. Appropriate sealing is necessary between the inflator and mounting plate.

Further, the sensor can be a differential pressure sensor additionally fluidly coupled to the outside of the module. A differential pressure sensor will measure the change in pressure within the chamber when the horn area is depressed while compensating for changes in atmospheric pressure and temperatures.

It is known that an air bag module cover can be integrally formed into a steering wheel assembly. The module components, including the cushion and inflator, are inserted into the steering wheel. The mounting plate is then attached to the steering wheel with cover to form a steering assembly. The airtight chamber can be formed from the integral steering wheel cover and the mounting plate.

The invention includes a method for producing an air bag module assembly, as well as a method of repairing the air bag module.

Many other objects and purposes of the invention will be clear from the following detailed description of the drawings

DETAILED DESCRIPTION OF THE DRAWINGS

Figure 1:
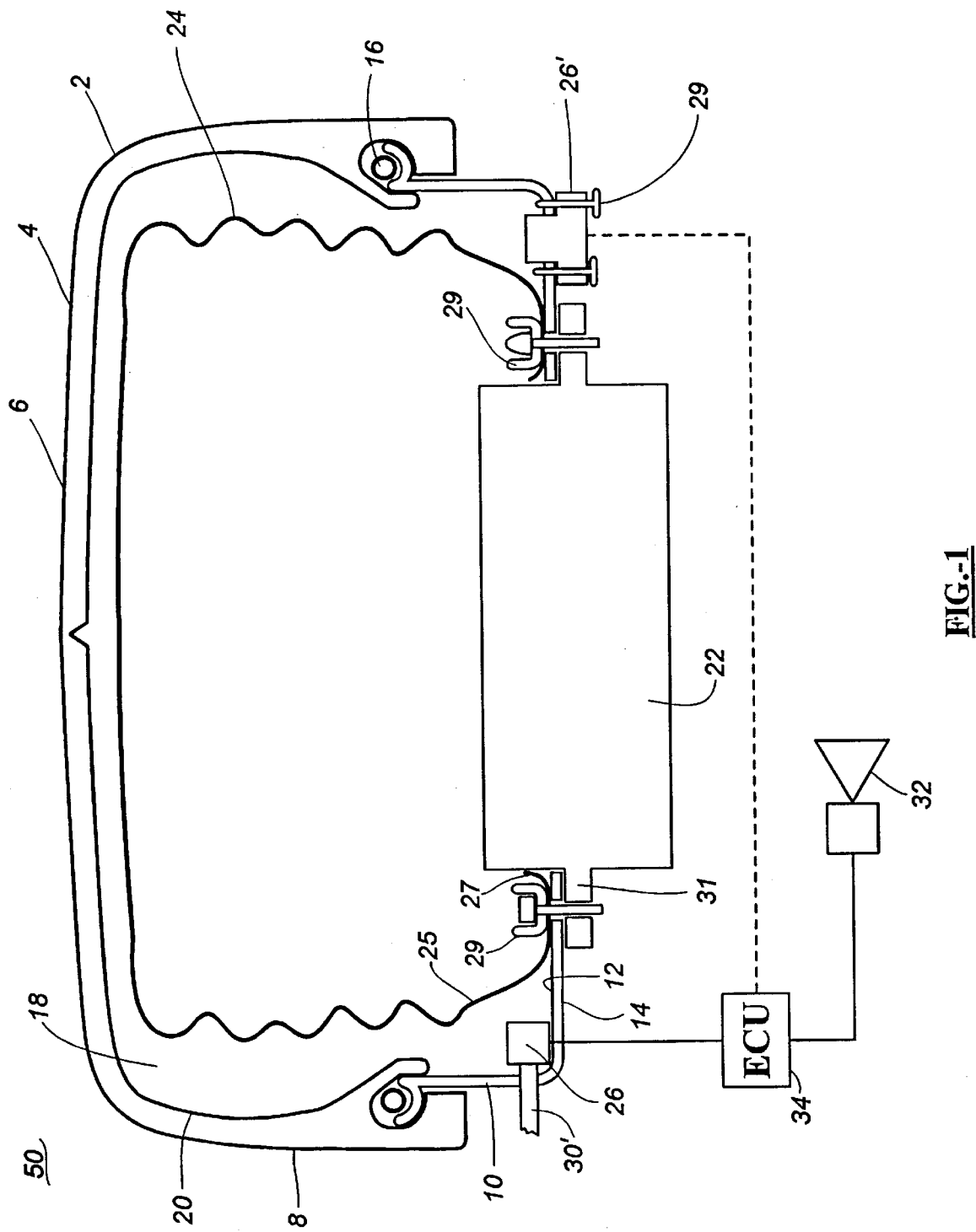
FIG. 1 is a cross-sectional view of an air bag module constructed in accordance with this invention.

It is not the intent that the invention be limited to the specific embodiment illustrated in the drawings and described herein.

FIG. 1 shows the basic components of a driver side air bag module 50 incorporating the present invention. The module includes a cover 2, having a horn actuation area 4 on a top portion 6, an interior surface 20, depending sides 8 and a mounting plate 10, with an upper surface 12 and a lower surface 14. The cover 2 is fixedly attached to the mounting plate 10 by having the sides 8 engage the mounting plate forming a sufficiently airtight chamber 18 between the interior surface 20 of the cover 2 and the mounting plate upper surface 12. An optional sealing material 16 is shown at the junction of the cover 2 and mounting plate 10 to provide an enhanced seal.

Additionally the module 50 has an inflator 22 or gas generator of known type to provide inflation gas to an air bag or cushion 24 disposed within the chamber 18. Disposed within the chamber 18 is a sensor 26 In the preferred embodiment of the invention the sensor 26 is a differential pressure sensor such as MPX5010 made by Motorola, responsive to changes in pressure within the chamber 18 caused by changes in the volume of the chamber. Sensor 26 is additionally fluidly coupled to the atmosphere through tube 30'. The sensor 26 is diagrammatically connected to an electrical control unit 34, which in turn is connected to a horn 32.

FIG. 1 also shows as an alternative sensor 26' located on the lower surface 14 of the mounting plate external to the chamber 18 and fluidly coupled to chamber 18. In this embodiment, sensor 26' can similarly be the Motorola differential pressure sensor. As can be appreciated the sensor 26' is removably mounted to the mounting plate 10, using removable fasteners 29 or the like, to facilitate the repair of a defective sensor without having to remove any other member of the module. This could not be accomplished in the prior art in which pressure sensing elements were constructed integral with the cover.

The following describes the operation of the present invention. The driver places his hand on the horn actuation area 4 deforming the cover 2, reducing the volume of the chamber 18. The change in volume of the chamber 18 causes a change in pressure within the chamber. The sensor 26 detects the changing pressure or the rate of change of pressure in the chamber 18. The sensor then transmits a signal to an electronic control unit 34 which is used to activate the horn 32. When the hand is removed from the actuation area 4, the volume of the chamber 18 returns to its original size. The corresponding decrease in the pressure in the chamber 18 is detected by the sensor 26. The control unit 34 will then disengage the horn.

Figure 2:
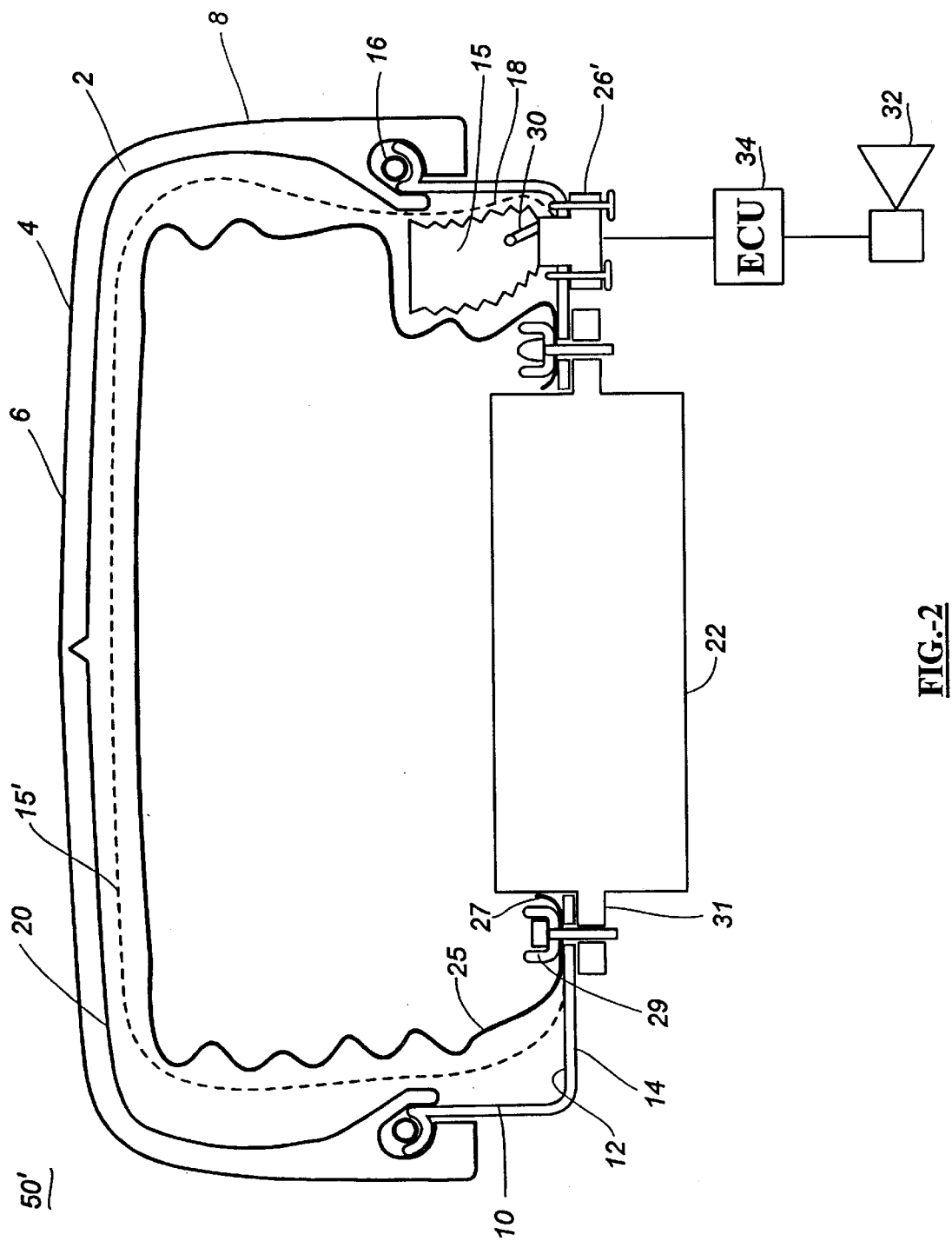
FIG. 2 shows an alternate embodiment of the invention having a bladder within an air bag module.

Reference is made to FIG. 2, which shows an alternate air bag module 50'. Components that are similar to those shown in FIG. 1 are referred to by the same numerals. In this embodiment the pressure or fluid-tight chamber is formed using a pressurized bladder (or alternatively a sealed bellows) 15 which will return to its original volume after compression, rather than sealing the cover to the mounting plate. If a pressurized bladder is used it is filled to a pressure above atmospheric. A pressure sensor 26' is located on the lower surface 14 of the mounting plate and is fluidly coupled to the bladder or bellows 15 by a tube 30. The sensor 26 is additionally electrically coupled to the control unit 34.

The operation of this embodiment of the invention is generally similar to that described above with the exception that the pressure sensed is the result of a change in volume of the chamber 18 of the bladder or bellows 15. As can be seen the bladder 15 can be mounted beneath the folded cushion 24. To activate the horn, the cover 2 is depressed, compressing the cushion 24 which in turn compresses the bladder, changing its internal pressure. Alternatively, a pressurized bladder 15' can be positioned about the cushion 24 between the cushion and the cover.

Figure 3:
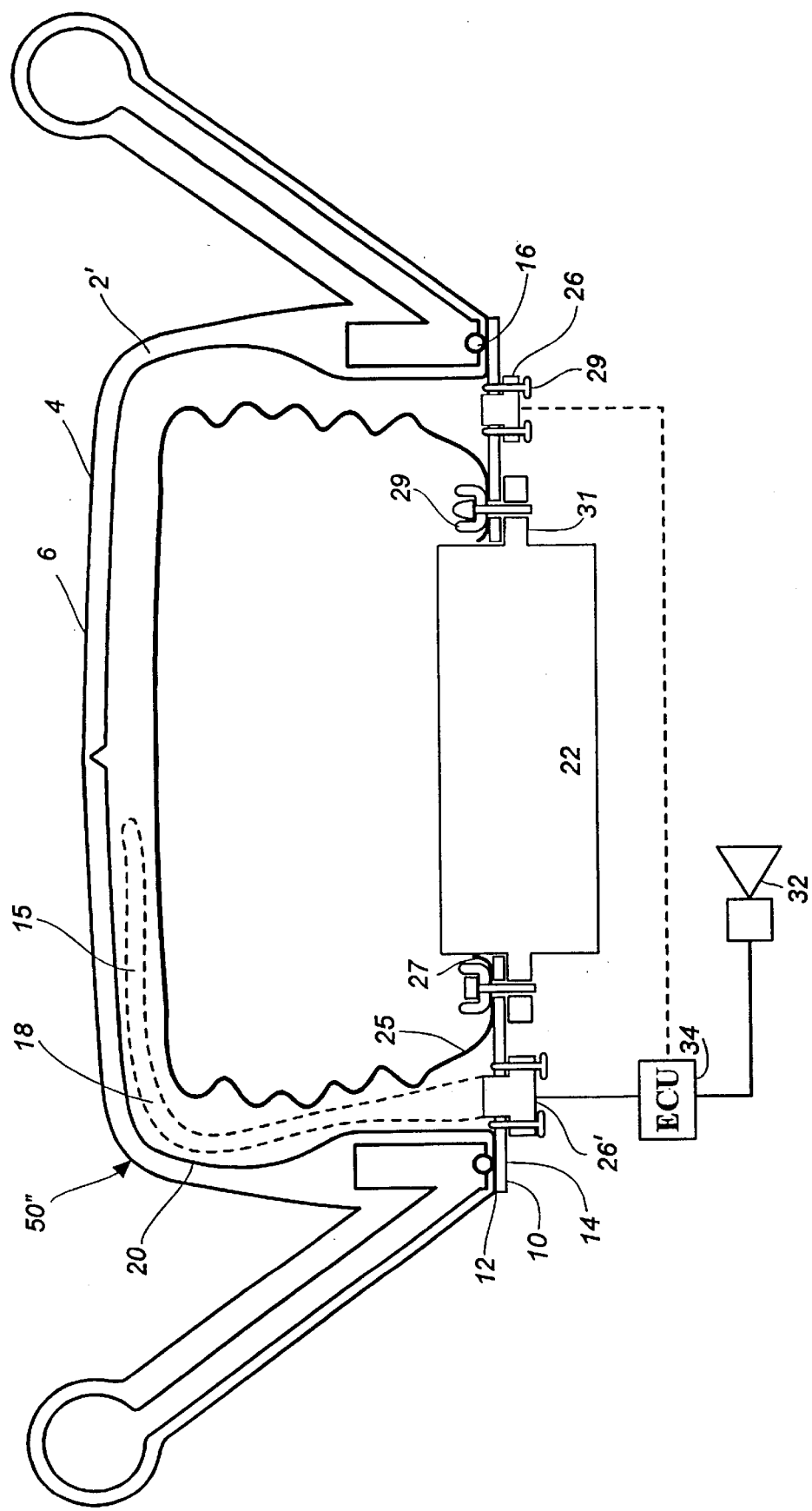
FIG. 3 shows an alternate embodiment of the invention having a cover integrally connected to steering wheel.

Reference is made to FIG. 3, which shows an alternate air bag module 50". Components that are similar to those shown in FIG. 1 are referred to by the same numerals. In this embodiment the air bag module cover 2' is integrally molded into the steering wheel assembly. The pressure or fluid-tight chamber 18 is shown formed using a bladder 15 (which completely or partially envelops the cushion) or alternatively by sealing the wheel cover assembly 2' to the mounting plate 10. Sealing material 16 is seen between the mounting plate 10 and the cover assembly 2'. A pressure sensor 26' is located on the lower surface 14 of the mounting plate and is fluidly coupled to the bladder 15. The sensor 26' is additionally electrically coupled to the control unit 34. Alternatively, if a bladder is not used, sensor 26 can be fluidly coupled to the chamber 18.

The operation of this embodiment of the invention is generally similar to that described above. The module assembly 50 will be manufactured similar to standard driver side air bag modules. First, the neck portion 25 of the cushion 24 having an opening 27 is fixed to the mounting plate 10. A sealing ring 29 clamps the neck portion 25 to the mounting plate or alternatively to the flange 31 of the inflator 22. The cushion 24 is then folded and the cover 2 is placed onto the mounting plate 10 forming a seal between the mounting plate and the cover. A sealing material 16 may be optionally placed or dispensed between the mounting plate 10 and the cover 2. The sensor 26 is then fixed to the bottom of the mounting plate 10 fluidly coupling the sensor 26 to the primarily airtight chamber 18.

If a bladder 15 is used to form the sufficiently airtight chamber, it is either placed around the air bag cushion 24 or placed into the module 50 prior to the cover 2 being attached to the mounting plate 10. The sensor 26 will be fluidly coupled to the chamber 18.

Many changes and modifications in the above described embodiment of the invention can, of course, be carried out without departing from the scope thereof. Accordingly, that scope is intended to be limited only by the scope of the appended claims.

I claim:

1. A driver side air bag module (50) comprising: a substantially airtight chamber (15, 18), sensing means (26) fluidly coupled to the chamber (18), responsive to changes in pressure within the chamber (18) for generating a horn activation signal indicative of a predetermined change in pressure.

2. The module as defined in claim 1 wherein the module (50) includes a cover (2) sealingly coupled to a mounting plate (10) wherein the chamber (18) is formed between an inner surface (20) of the cover and an upper surface (12) of the mounting plate.

3. The module as defined in claim 1 further comprises: sealing means (16), a cushion (24), an inflator (22), a mounting plate (10) having an upper surface (12), a cover (2), having an inner surface (20), being coupled to the mounting plate (10), the sealing means (16) being disposed between the mounting plate (10) and the cover (2), wherein the chamber (18) is formed between the inner surface (20) and the upper surface (12).

4. The air bag module as defined in claim 1 wherein the module cover (2') is integrally incorporated into a steering wheel assembly.

5. The air bag module as defined in claim 1 wherein the chamber is formed by a primarily closed flexible bladder (15).

6. The air bag module as defined in claim 1 wherein the chamber is formed by a sufficiently closed flexible bellows (15).

7. The air bag module as defined in claim 1 wherein the sensing means (26) is located within the chamber (18).

8. The air bag module as defined in claim 1 wherein the sensing means (26) is placed outside the air bag module (50) and fluidly coupled to said chamber (18) to respond to change in pressure within the chamber.

9. The air bag module (50) as defined in claim 1 wherein the sensing means (26) is a differential pressure sensor additionally fluidly coupled to the outside of the module for measuring the relative change in pressure within the module.

10. The air bag module (50) as defined in claim 1 wherein the sensing means (26) is removably mounted to the mounting plate (10).

11. The air bag module (50) as defined in claim 5 wherein the bladder (15) is substantially between the cushion (24) and the mounting plate upper surface (12).

12. The air bag module (50) as defined in claim 5 wherein the bladder (15) is substantially between the cushion (24) and the cover lower surface (20).

13. The air bag module (50) as defined in claim 5 wherein the bladder (15') substantially encloses the cushion (24).

14. A method for producing an air bag module assembly (50) as defined in claim 3 comprising the steps of:

(a) providing an air bag cover (2), a mounting plate (10), the mounting plate having a top surface (12), inflation means (22), an air bag cushion (24), a sensing means (26); and (b) mounting the inflation means (22), the cushion (24), the sensing means (26) to the top surface (12), mounting the air bag cover (2) to the mounting plate (10) forming a primarily airtight chamber (18).

15. A method for producing an air bag module (50) assembly having a pressure sensor (26) comprising the steps of:
    (a) providing an air bag cover (2), a mounting plate (10), the mounting plate having a bottom surface (14), inflation means (22), an air bag cushion (24), a sensing means (26);
    (b) mounting the inflation means (22), the cushion (24) to the mounting plate (10), folding the cushion (24), mounting the air bag cover (2) to the mounting plate (10) to form an airtight chamber (18),
    (c) mounting the sensor (26) means to the bottom surface (14) and
    (d) fluidly coupling the sensor (26) means to the chamber (18).

16. A driver side air bag module (50) comprising a flexible cover (2) formed in cooperation with a mounting plate (10) a sealed chamber (18), an air bag within the chamber (18) and a sensor (26) responsive to one of fluid pressure or changes in fluid pressure or change in volume within the chamber (18).

17. The method of generating a horn signal from the airbag module as defined in claim 16, which comprises the steps of:
    a) depressing the cover (2) to generate one of a change in pressure or change in volume in the chamber (18),
    b) sensing a determinable change in chamber (18) pressure and
    c) generating an electric signal to activate a horn (32).

18. The method as defined in claim 13 including the step of:
    c) removing the sensing means, without removing the cover, upon determination that the sensing means has malfunctioned.

* * * * *